(12) United States Patent
Gonzalez et al.

(10) Patent No.: US 9,842,041 B1
(45) Date of Patent: Dec. 12, 2017

(54) APPROXIMATION OF DATASTORE STORING INDEXED DATA ENTRIES

(71) Applicant: TOYOTA JIDOSHA KABUSHIKI KAISHA, Toyota-shi, Aichi-ken (JP)

(72) Inventors: Nikos Arechiga Gonzalez, San Mateo, CA (US); Shashank Jivan Vernekar, Los Angeles, CA (US); Sumanth Dathathri, Pasadena, CA (US); Shinichi Shiraishi, San Jose, CA (US)

(73) Assignee: Toyota Jidosha Kabushiki Kaisha, Tokyo (JP)

(*) Notice: Subject to any disclaimer, the term of this patent is extended or adjusted under 35 U.S.C. 154(b) by 0 days.

(21) Appl. No.: 15/364,093

(22) Filed: Nov. 29, 2016

(51) Int. Cl.
*G06F 19/22* (2011.01)
*G06F 19/28* (2011.01)
*C12Q 1/68* (2006.01)
*G06F 19/00* (2011.01)
*G06F 11/36* (2006.01)
*G06N 99/00* (2010.01)

(52) U.S. Cl.
CPC ....... *G06F 11/3604* (2013.01); *G06N 99/005* (2013.01)

(58) Field of Classification Search
CPC .............. G06K 9/00798; G06G 1/167; G01S 2013/9353; G01S 2013/9357; G06F 19/18; G06F 19/22; G06F 11/3604; C12Q 2537/16; C12Q 2537/165
See application file for complete search history.

(56) References Cited

U.S. PATENT DOCUMENTS

| 8,997,063 | B2 * | 3/2015 | Krajec | G06F 11/3636 |
| | | | | 717/125 |
| 2012/0116688 | A1 * | 5/2012 | Mishra | G06F 19/22 |
| | | | | 702/20 |
| 2012/0130925 | A1 * | 5/2012 | Risvik | G06F 17/30696 |
| | | | | 706/12 |
| 2013/0345926 | A1 | 12/2013 | Boulton et al. | |
| 2014/0189653 | A1 * | 7/2014 | Larson | G06F 11/3604 |
| | | | | 717/125 |
| 2014/0258988 | A1 * | 9/2014 | Neogi | G06F 9/5061 |
| | | | | 717/126 |

(Continued)

OTHER PUBLICATIONS

D. White, dsOli: data structure operation location and identification, Jun. 2014, 5 pages.*

(Continued)

*Primary Examiner* — Thuy Dao
(74) *Attorney, Agent, or Firm* — Patent Law Works LLP

(57) ABSTRACT

The technology can compute an approximation of a datastore storing a multiplicity of indexed data. An example method can a template including programming logic that, when executed, calculates output(s) based on input(s) and undetermined parameter(s). The undetermined parameter(s) are input into a machine learning framework. Data entries reflecting one or more inputs are retrieved from a datastore and input into the machine learning framework, which determines value(s) for the undetermined parameter(s), respectively (making them determined parameters). The example method generates an approximation of the datastore using the determined parameter(s) and the input(s).

19 Claims, 12 Drawing Sheets

(56) References Cited

U.S. PATENT DOCUMENTS

| | | | | |
|---|---|---|---|---|
| 2014/0375804 A1* | 12/2014 | Bulan | .................... | H04N 7/18 |
| | | | | 348/148 |
| 2015/0089489 A1 | 3/2015 | Sarkar et al. | | |
| 2015/0106793 A1 | 4/2015 | Kahne et al. | | |
| 2015/0286820 A1 | 10/2015 | Sridhara et al. | | |
| 2015/0324195 A1 | 11/2015 | Henriksen et al. | | |
| 2015/0363192 A1* | 12/2015 | Sturtevant | ................. | G06F 8/72 |
| | | | | 717/131 |
| 2016/0171893 A1* | 6/2016 | Chen | .................... | G08G 1/167 |
| | | | | 701/300 |
| 2017/0061321 A1* | 3/2017 | Maiya Belur | .... | G06Q 10/06315 |

OTHER PUBLICATIONS

Cheng et al., Dynamic ad layout revenue optimization for display advertising, Aug. 2012, 9 pages.*
Jeannin et al., "Formal Verification of ACAS X, an Industrial Airborne Collision Avoidance System," Proceedings of the 12th International Conference on Embedded Software, 2015 (10 pages).
Wikipedia, "Lookup table," download from https://en.wikipedia.org/wiki/Lookup_table on Nov. 9, 2016 (5 pages).
Wikipedia, "Piecewise," download from https://en.wikipedia.org/wiki/Piecewise on Nov. 9, 2016 (2 pages).
Dathathri et al., "Learning-Based Abstractions for Nonlinear Constraint Solving," Proceedings of the Twenty-Sixth International Joint Conference on Artificial Intelligence, Aug. 25, 2017 (8 pages).

* cited by examiner

700 →
```
if (f₁(a,x)>0)
    y=g₁(a,x)
elseif (f₁(a,x)>0)
    y=g₂(a,x)
    ⋮
elseif (fₙ(a,x)>0)
    y=gₙ(a,x)
end
```

702 →
$$y = g_1(a,x) \cdot \mathrm{sigmoid}(f_1(a,x)) + $$
$$g_2(a,x) \cdot \mathrm{sigmoid}(f_2(a,x)) + $$
$$\ldots + $$
$$g_n(a,x) \cdot \mathrm{sigmoid}(f_n(a,x)) + $$

Figure 7A

704 →
```
if (f₁(a,x)>0)
    y=g₁(a,x)
elseif (f₁(a,x)>0)
    y=g₂(a,x)
    ⋮
elseif (fₙ(a,x)>0)
    y=gₙ(a,x)
end
```

706 →

$$\tilde{y}(x,a) = \sum_{i=1}^{k} f_i(x,a) \left( \prod_{k=1}^{i-1} \mathrm{sigmoid}(g_k(x,a)) \right) \mathrm{sigmoid}(g_i(x,a))$$

Figure 7B

APPROXIMATION OF DATASTORE STORING INDEXED DATA ENTRIES

BACKGROUND

The present disclosure relates to software program verification.

In computing, formal verification and testing are often used for system verification, such as model-based development of automotive software, to determine that a given design is defect-free. FIG. 1A is a block diagram of an example automotive feedback control system which uses lookup tables (LUTs), which may be populated using experimental data. In this example, the controller 102 can use LUTs as control code to allow for simplified changes to control behavior in different environments. The monitor 104 can use LUTs to model physical components when components are difficult to model accurately from physical principles. This can help to attain a desired effect when checked by the monitor in block 106.

Theoretically, formal verification can addresses an infinite number of scenarios because there may be infinitely many possible inputs. As an example, FIG. 1B is a block diagram illustrating an example system 110 receiving inputs $x_1$-$x_n$, and outputting outputs $y_1$-$y_n$. In this example, the verification goal is to prove that when the inputs satisfy a certain assumption, the outputs satisfy a certain guarantee, as illustrated by the following formula:

$$\text{assume}(x_1, \ldots, x_n) \Rightarrow \text{guarantee}(y_1, \ldots, y_m).$$

However, computing the outcomes of an infinite number, or even a huge number of, possible inputs $x_n$ is not practical, which makes formal verification impractical to scale to meet the requirements of complex systems, such as automotive software. This can be particularly true for industrially deployed software, such as automotive software. In automotive software, a source of complexity is LUTs, of which automotive software in particular often makes heavy use, and which typically have numerous entries which are used for making control decisions and/or as models of physical processes. LUTs must be proven case by case. Cascaded LUTs can increase the number of proof cases exponentially.

For instance, in one case study based on a real automotive software component, there were $10^{50}$ proof cases. If each proof case could be resolved in 0.01 seconds on a cluster with one million cores, the total proof would take on the order of $10^{34}$ years to complete, which is clearly impractical in real world scenarios. On the other hand, automotive software is often complex and safety critical, so ensuring the software is bug free and that the different components of the software work safely and correctly may be essential. The scalability challenge associated with LUTs in formal verification of automotive software is often regarded as one of the most difficult unsolved problems.

As a further example, FIG. 1C depicts an example simple system model 114. In this example, ideally, when the input is between [0, 4], the output should never not be a number (NaN). Formal verification can theoretically attempt to prove mathematically that the denominator (x−3.26598) is never zero over [0, 4] by identifying that, a certain x, y is undefined. However, since there are an infinite number of inputs possible, determining this result with perfect resolution or even limited resolution is impractical, particularly in real world applications, as it would require too much time.

Thus, while formal verification provides a theoretical mathematical proof for establishing whether the system behaves correctly under all possible inputs, it is computationally expensive and impractical to scale for most scenarios that involve numerous inputs as described above.

In contrast, testing shows that the system behaves correctly in a single scenario, and may be iterated for a number of scenarios to show correct behavior. However, it is resolution constrained because it is limited to a certain set of inputs, and thus unable to verify a design is 100% error free. Thus, many tests can show correct behavior in many scenarios, but only finitely many. As a result, in practical terms, there are design bugs that are very difficult to catch with testing.

On the other hand, with testing, determining which inputs break the model is also challenging because the algorithm would have to randomly determine those unknown input values. Most tests would indicate the system works correctly based on a predetermined set of inputs and possibly promote a false sense of security. So while testing may be computationally more achievable and scalable than formal verification, it is often unable to determine that a design is error free (e.g., 100% error free, within a certain number of standard deviations, etc.).

As a result, in general, efficiently and automatically verifying software that uses LUTs is beyond the capabilities of many existing techniques. For instance, one existing approach that proposes a solution for analyzing a model (embodying an air-flight controller) that contains LUTs is described by the publication "Formal Verification of ACAS X, an Industrial Airborne Collision Avoidance System," by J. B. Jeannin, K. Ghorbal, Y. Kouskoulas, R. Gardner, A. Schmidt, E. Zawadki, A. Platzer ("Jeannin"), In EMSOFT, 2015. Jeannin's model can produce around a trillion proof cases. In light of this, Jeannin describes using an interactive theorem prover to manually simplify the model and infer sufficient conditions for elements of the lookup table to be safe, and then the elements of the lookup table are checked on a supercomputer. However, the approach proposed by Jeannin is not adequate because it is not automatic and it requires heavy intervention by a human user to decompose the proof before appropriate conditions on the LUTs can be derived. Additionally, Jeannin's approach is highly computationally expensive.

Some further solutions attempt to approximate LUTs, such as over-approximation approaches that abstract and refine an LUT using CEGAR loops. Under this approach, as shown in FIG. 2, an approximation of points is computed that yield the smallest error possible; upper and lower bounds 206 and 208 are offset to a certain degree using the approximation; and linearly interprets points 204 and verifies whether any of the points crosses the upper or lower bounds. If so, the approach selects a set of sample points, adds them to the LUTs, and repeats the procedure until the problematic areas are fit.

However, since approximations, such as 204, often have conflicting requirements (e.g., low error rate and low complexity), the CEGAR loop-based solutions are generally unable to producing accurate functions that reliably approximate an LUT, particularly since industrial LUTs frequently have sharp corners 210 that suggest a hard transition between different regimes of operation, as shown in FIG. 2. Thus, current simple approximating functions, which are generally smooth, generally fail to adequately fit a sharp corner (e.g., with a smooth function), and generally result in using complex functions having high arithmetic complexity, such as polynomials of high degree, which are difficult to analyze efficiently.

What is needed is a scalable solution that can model complex data, like LUTs, so it can be verified efficiently.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer-implemented method for abstracting a dataset storing a multiplicity of data, including: determining, using one or more computer processors, a template including programming logic that, when executed, calculates one or more outputs based on one or more inputs and one or more parameters, the one or more parameters being initially one or more undetermined parameters; inputting, using the one or more computer processors, the one or more undetermined parameters into a machine learning framework; retrieving, from a datastore storing a multiplicity of indexed data entries, one or more data entries reflecting one or more inputs; inputting, using the one or more computer processors, the one or more inputs into the machine learning framework; determining, using the one or more computer processors and the machine learning framework, one or more values for the one or more undetermined parameters, respectively, the one or more values being values for the one or more undetermined parameters, respectively, and making the one or more undetermined parameters, one or more determined parameters; and generating, using the one or more computer processors, an approximation of the datastore using the one or more determined parameters and the one or more inputs.

Other embodiments of this aspect include corresponding computer systems, apparatus, and computer programs recorded on one or more computer storage devices, each configured to perform the actions of the methods.

Implementations may include one or more of the following features. The computer-implemented method where the datastore includes one or more lookup tables associated with a complex system. The computer-implemented method where the complex system is an automotive system. The computer-implemented method where generating the approximation of the datastore includes determining an upper bound and a lower bound for the multiplicity of indexed data entries. The computer-implemented method where the one or more undetermined parameters include a plurality of undetermined parameters, the programming logic includes a plurality of conditional statements, each of the conditional statements includes a corresponding undetermined parameter from the plurality of undetermined parameters, the one or more values determined using the machine learning framework include a plurality of values for the undetermined parameters, respectively, and making the plurality of undetermined parameters a plurality of determined parameters. The computer-implemented method where the one or more inputs includes a plurality of inputs, the programming logic includes a piecewise function, each of the conditional statements includes a different sub-function of the piecewise function, each of the different sub-function includes the corresponding undetermined parameter and a corresponding input from the plurality of inputs. The computer-implemented method where retrieving the one or more data entries reflecting the one or more inputs includes retrieving a plurality of data entries reflecting a plurality of cases, and generating the approximation of the datastore includes summing the cases. The computer-implemented method where the plurality of cases are mutually exclusive and the summing the cases includes calculating a sum of sigmoids. The computer-implemented method where the plurality of cases are concordant and generating the approximation includes adding an additional product to disable to disable previous cases. The computer-implemented method where the multiplicity of indexed data entries includes 1010 or more entries. The computer system where the datastore includes one or more lookup tables associated with a complex system. The computer system where the complex system is an automotive system. The computer system where generating the approximation of the datastore includes determining an upper bound and a lower bound for the multiplicity of indexed data entries. The computer system where the one or more undetermined parameters include a plurality of undetermined parameters, the programming logic includes a plurality of conditional statements, each of the conditional statements includes a corresponding undetermined parameter from the plurality of undetermined parameters, the one or more values determined using the machine learning framework include a plurality of values for the undetermined parameters, respectively, and making the plurality of undetermined parameters a plurality of determined parameters. The computer system where the one or more inputs includes a plurality of inputs, the programming logic includes a piecewise function, each of the conditional statements includes a different sub-function of the piecewise function, each of the different sub-function includes the corresponding undetermined parameter and a corresponding input from the plurality of inputs. The computer system where retrieving the one or more data entries reflecting the one or more inputs includes retrieving a plurality of data entries reflecting a plurality of cases, and generating the approximation of the datastore includes summing the cases. The computer system where the plurality of cases are mutually exclusive and the summing the cases includes calculating a sum of sigmoids. The computer system where the plurality of cases are concordant and generating the approximation includes adding an additional product to disable to disable previous cases. The computer system where the multiplicity of indexed data entries includes 1010 or more entries. Implementations of the described techniques may include hardware, a method or process, or computer software on a computer-accessible medium.

One general aspect includes a computer system, including: one or more computer processors; one or more computer memories storing instructions that, when executed by the one or more computer processors, perform operations including determining a template including programming logic that, when executed, calculates one or more outputs based on one or more inputs and one or more parameters, the one or more parameters being initially one or more undetermined parameters; inputting the one or more undetermined parameters into a machine learning framework; retrieving from a datastore storing a multiplicity of indexed data entries, one or more data entries reflecting one or more inputs; inputting the one or more inputs into the machine learning framework; determining, using the machine learning framework, one or more values for the one or more undetermined parameters, respectively, the one or more values being values for the one or more undetermined parameters, respectively, and making the one or more undetermined parameters, one or more determined parameters; generating an approximation of the datastore using the one or more determined parameters and the one or more inputs.

Other embodiments of this aspect include corresponding computer systems, apparatus, and computer programs recorded on one or more computer storage devices, each configured to perform the actions of the methods.

Implementations may include one or more of the following features. The computer system where the datastore includes one or more lookup tables associated with a complex system. The computer system where the complex system is an automotive system. The computer system where generating the approximation of the datastore includes determining an upper bound and a lower bound for the multiplicity of indexed data entries. The computer system where the one or more undetermined parameters include a plurality of undetermined parameters, the programming logic includes a plurality of conditional statements, each of the conditional statements includes a corresponding undetermined parameter from the plurality of undetermined parameters, the one or more values determined using the machine learning framework include a plurality of values for the undetermined parameters, respectively, and making the plurality of undetermined parameters a plurality of determined parameters. The computer system where the one or more inputs includes a plurality of inputs, the programming logic includes a piecewise function, each of the conditional statements includes a different sub-function of the piecewise function, each of the different sub-function includes the corresponding undetermined parameter and a corresponding input from the plurality of inputs. The computer system where retrieving the one or more data entries reflecting the one or more inputs includes retrieving a plurality of data entries reflecting a plurality of cases, and generating the approximation of the datastore includes summing the cases. The computer system where the plurality of cases are mutually exclusive and the summing the cases includes calculating a sum of sigmoids. The computer system where the plurality of cases are concordant and generating the approximation includes adding an additional product to disable to disable previous cases. The computer system where the multiplicity of indexed data entries includes 1010 or more entries. Implementations of the described techniques may include hardware, a method or process, or computer software on a computer-accessible medium.

It should be noted that the language used in the present disclosure has been principally selected for readability and instructional purposes, and not to limit the scope of the subject matter disclosed herein.

BRIEF DESCRIPTION OF DRAWINGS

The disclosure is illustrated by way of example, and not by way of limitation in the figures of the accompanying drawings in which like reference numerals are used to refer to similar elements.

FIGS. 7A and 7B are diagrams showing example approximations.

DETAILED DESCRIPTION

The technology described herein can advantageously compute an approximation of datastore(s) storing a multiplicity of indexed data. An example of such a datastore may include lookup table(s) (LUT(s)). The datastore(s) may store large volumes of data reflect a myriad different cases. For instance, the multiplicity of data entries may include $10^{10}$ or more entries in some cases, although other data volumes are also applicable and contemplated.

The datastore(s) may be associated with a complex system, such as an automotive control system, aircraft control system, factory control system, etc., that is impractical to model using a formula and is often modeled using experimental data. Further example systems may include the engine, transmission, autonomous driving control, safety systems, etc., of a vehicle. For instance, an engine control may be responsible for regulating ignition control, fuel injection, heating and cooling, and other functions of the engine, the parameters of which may vary widely based on ambient temperature, driving mode (e.g., sport, economical, etc.), and the datastore(s) may a set of data entries (e.g., in two or more columns) for each use case of the engine, which can vary widely. In an example, each use case may correspond to a different set of entries. For instance, the datastore(s) may include data table(s) including columns for the data input and outputs and rows for each set of entries, although it should be understood that any other dataset formats are contemplated and encompassed by this disclosure.

The multiplicity of indexed data, or portions of the indexed data, may be disjointed from other portions and difficult to model using complex equations, such as polynomial functions, as described in the Background. For example, the indexed data may include sharp corners, steps, and/or other discontinuities that may be difficult to fit.

In some embodiments, the technology works from the datastore(s) to automatically derive tight approximations of the input-output behavior of the datastore(s). An approximation generated using the technology described herein may advantageously fit piecewise functions, which in turn, can provide a fit, within an acceptable confidence, sharp corners that may occur in the data stored in the datastore(s).

The technology provides numerous advantages including a scalable, improved system capable of verifying software having and/or reliant upon datastore(s) storing such data, while avoiding exponential complexity.

Figure 1A:
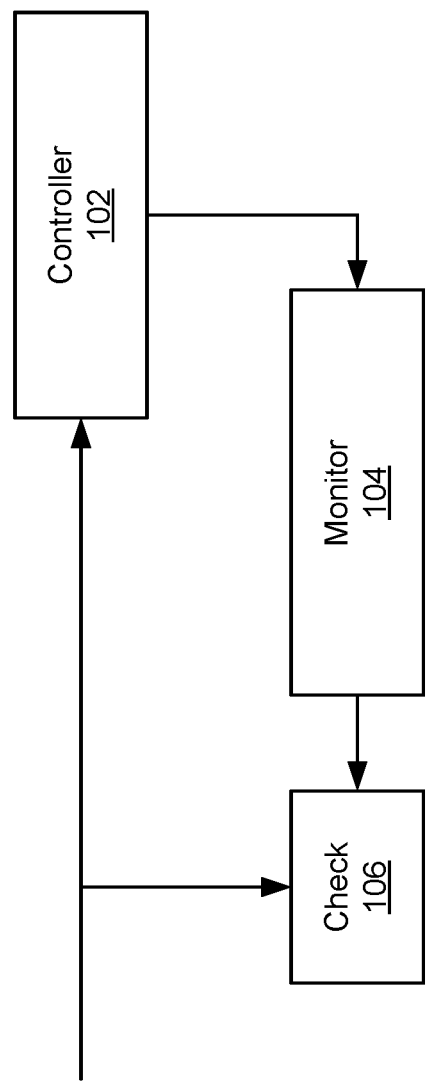
FIG. 1A is a block diagram of an example control system.
Figure 1B:
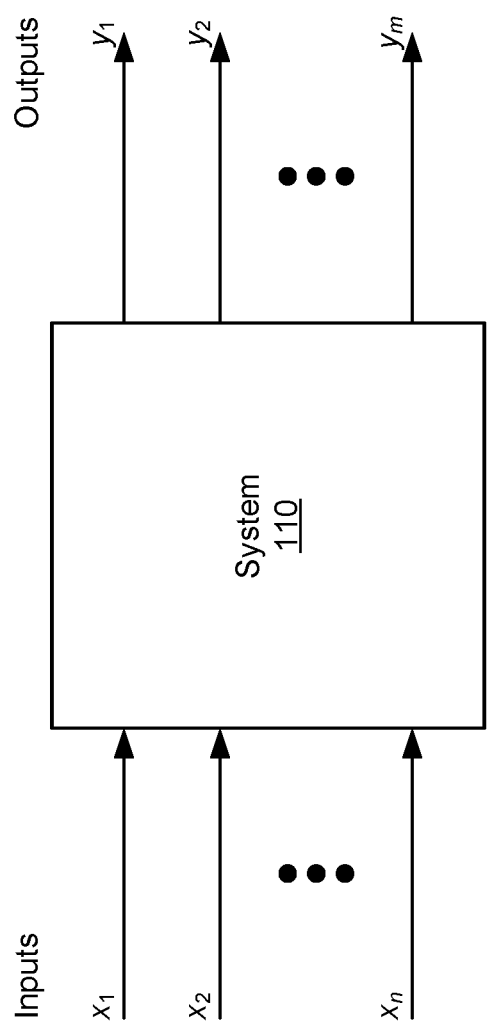
FIG. 1B is a block diagram of an example system receiving various inputs and outputting various outputs.
Figure 1C:
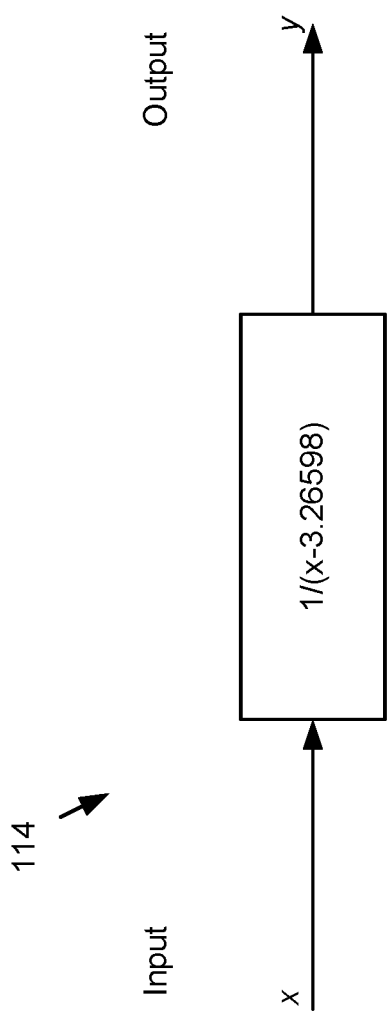
FIG. 1C is a block diagram of an example simple system model.
Figure 2:
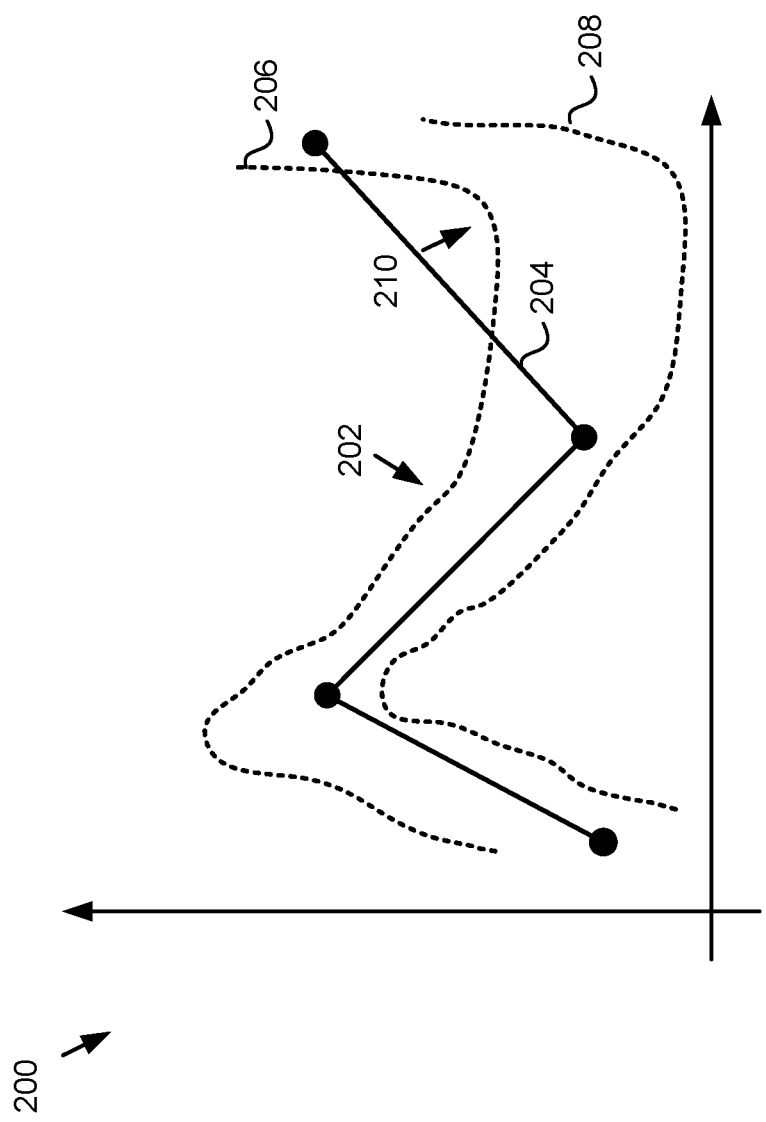
FIG. 2 is a graph indicating limitations of bounding functions determined using existing solutions.
Figure 3A:
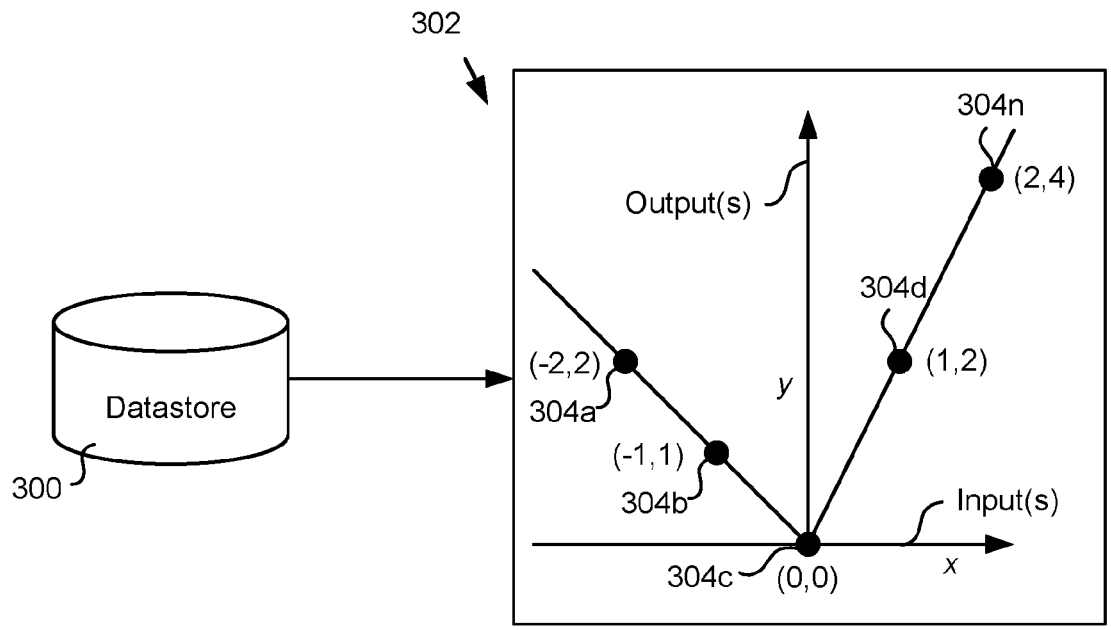
FIG. 3A is a block diagram of example input/output behavior of a datastore.
Figure 3B:
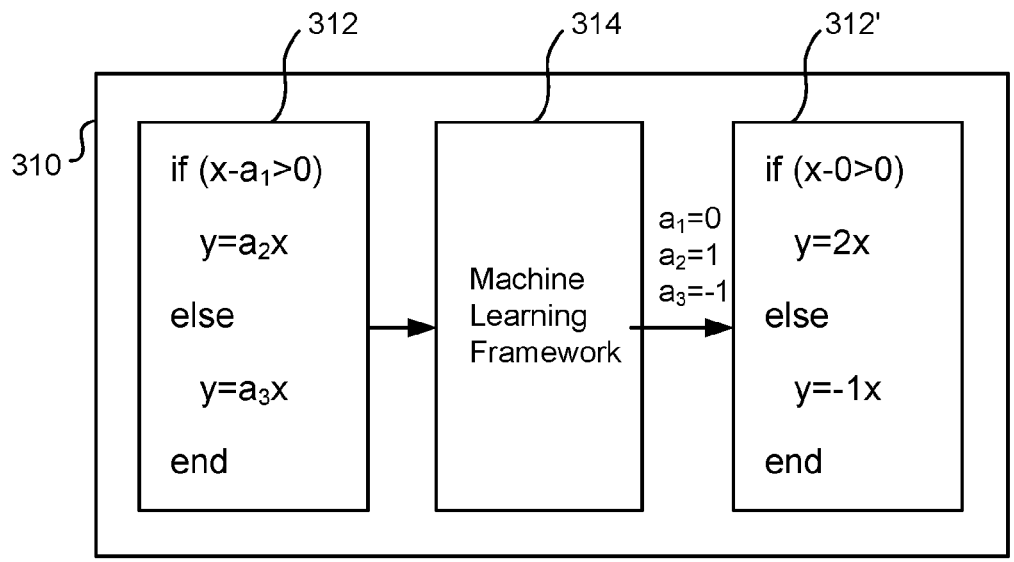
FIG. 3B is a block diagram of an example approximation generator.

FIG. 3A is a block diagram of example input/output behavior 302 of an example datastore 300, and FIG. 3B is a block diagram of an approximation generator 310 configured to generate an approximation of the datastore using a machine learning framework 314 and a program template 312. The points 304a-304n (also simply referred to as 304) are data from the datastore 300. The x values of the points 304 reflect an input value and the y values of the points 304 reflect an output value. The behavior 302, when graphed, shows the disjointed, piecewise nature of the data points 304.

The program template 312 (also simply called a template), including programming logic that, when executed, calculates output(s) based on input(s) and parameter(s). The parameter(s) (also called variables) in the template 312 (e.g., $a_1$, $a_2$, $a_3$, etc.) may be initially undetermined, and the machine learning framework 314 is configured to learn the parameter values (thus making the undetermined parameters determined). In some instances, the programming logic includes conditional statements collectively representing a piecewise function. For instance, each of the conditional statements may include a different sub-function of the piecewise function. Each of the sub-functions may include corresponding undetermined variable(s)/parameter(s) and input(s), and may be processed to generate an output.

As a further example, a piecewise template may include:

$$f(a, x) = \begin{cases} f_1(a, x) \text{ if } g_1(a, x) > 0 \\ f_2(a, x) \text{ if } g_1(a, x) \le 0 \wedge g_2(a, x) > 0 \\ \vdots \\ f_k(a, x) \text{ otherwise} \end{cases}$$

To improve the ability to differentiate at the switching surfaces. Instead, the approximation generator 310 may approximate the piecewise function by a smooth function. For instance, the piecewise function can be represented as a sum of functions that are turned on or off by using a step function. Assuming s: $\mathbb{R} \to \{0, 1\}$ denotes the Heaviside step function:

$$s(x) = \begin{cases} 0 \text{ if } x \le 0 \\ 1 \text{ otherwise} \end{cases}$$

Using the step function, the piecewise function may be represented by $$f = s(g_1) \cdot f_1 + (1 - s(g_2)) \cdot f_2 + \ldots + \left(\prod_{i=1}^{r-1} ((1-s(g_i)))\right) \cdot s(g_r) f_r + + \left(\prod_{i=1}^{k-1} ((1-s(g_i)))\right) \cdot s(g_k) f_k,$$

Since $f$ may possibly be discontinuous and non-differentiable, $f$ may be approximated with a continuous differentiable function by replacing the step function by the sigmoid function σ, which smoothly transitions from 0 to 1 as its argument crosses zero, such as:

$$\sigma(x) = \frac{1}{1 + e^{-x}}$$

$\cdot f_a(x) = \Sigma_{i=1}^{k} f_i(x,a) (\Pi_{k=1}^{i-1} (1-\sigma(-g_k(x,a)))) \sigma(g_i(x,a))$.

As depicted in FIG. 3B, an example template 312 has conditional statements: if x minus $a_1$ is greater than zero, then y equals $a_2$ times x, where $a_1$ and $a_2$ are both unknown/undetermined parameters. Otherwise y equals $a_3$ times x, where $a_3$ is an undetermined parameter, etc. The undetermined parameters may be input into the machine learning framework 314, which processes the processes the inputs, learns the parameter values, and outputs the parameter values. For example, the machine learning framework may output an array including the parameter values.

The machine learning framework 314 is configured to learn the undetermined parameters. As an example, consider a function f(a,x) that depends on a vector of inputs x but also on an unknown vector of parameters a. The parameters are unknown values that must be learned so the function from the template can be used.

In some instances, the machine learning framework 314 is configured to choose the parameters a so that at each k-th entry of the datastore 300 (k=1, . . . , m), $f(a,x_k)$ is as close as possible to the output of the lookup table, $y_k$. Various different approaches may be used by the machine learning framework 314 to solve for these parameter values, such as the following non-limiting examples:

Linear regression: Given a function template $y=a_1 x_1+a_2$, the goal is to find values of the parameter vector a=(a1, a2) such that the data fits well. The input vector is $x=(x_1)$ in this example is a single dimension.

Neural networks: While not required, the function template is often significantly more complex than those used under other approaches, such as linear regression. In an example using a neural network with a single neuron and two inputs, an example function template may be $y=\text{sigmoid}(a_1 x_1+a_2 x_2)$, where the input vector is $x=(x_1, x_2)$ and the parameter vector is $a=(a_1, a_2)$.

The machine learning framework 314 may be configured to accept, and allow the approximation generator 310 to specify as input, which template(s) to use for the function f(a, x). The machine learning framework 314 may also be instructed on which learning scheme to use for training. For instance, the machine learning framework 314 may be instructed to train using linear regression, instructed to train one or more neural networks, etc. This may be accomplished by inputting suitable program template(s) including the requisite and/or specific structure for that scheme (functions suitable for neural networks, linear regression, etc.).

Figure 9:
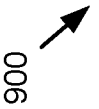
FIG. 9 depicts an example datastore.

In some embodiments, the machine learning framework 314 is configured to use sigmoids and weights determined based on the input data (e.g., parsed data and parsed templates) to calculate the values for the parameters, as discussed below in the embodiment discussed with reference to FIG. 9, for example. While sharing similarities with a template for a standard neural network, this embodiment differs because in a neural network, the input of the sigmoid function is usually linear, whereas the example is in general a nonlinear function $g_i$. Further, in a neural network, the sigmoid is not multiplied by anything, whereas, in the embodiment, each sigmoid is multiplied by the product of previous function g's, as well as the current function $f_i$. The embodiment is advantageous because it allows approximation of programming logic, such as conditional statements (e.g., if-then-else), which a standard neural network may, in some cases, not be able to approximate reliably.

In some embodiments, the machine learning framework 314 may support any number of machine-learning schemes, including but not limited to neural-network-based schemes. A non-limiting example of the machine learning framework 314 may include Google™ Tensor Flow, although other frameworks and machine learning algorithms other than neural network-based algorithms are also contemplated and encompassed by this disclosure.

In some embodiments, once the machine learning framework 314 solves for the undetermined parameter values, the values may be incorporated into the template 312 so the functions may be solved using the programming logic from the template. For instance, the approximation generator 310 may parse the template 312 and replace the unknown parameters with the determine values to produce populated template 312', as shown in FIG. 3B, and the verifier 420 may use the populated template(s) 312' during verification.

Figure 4:
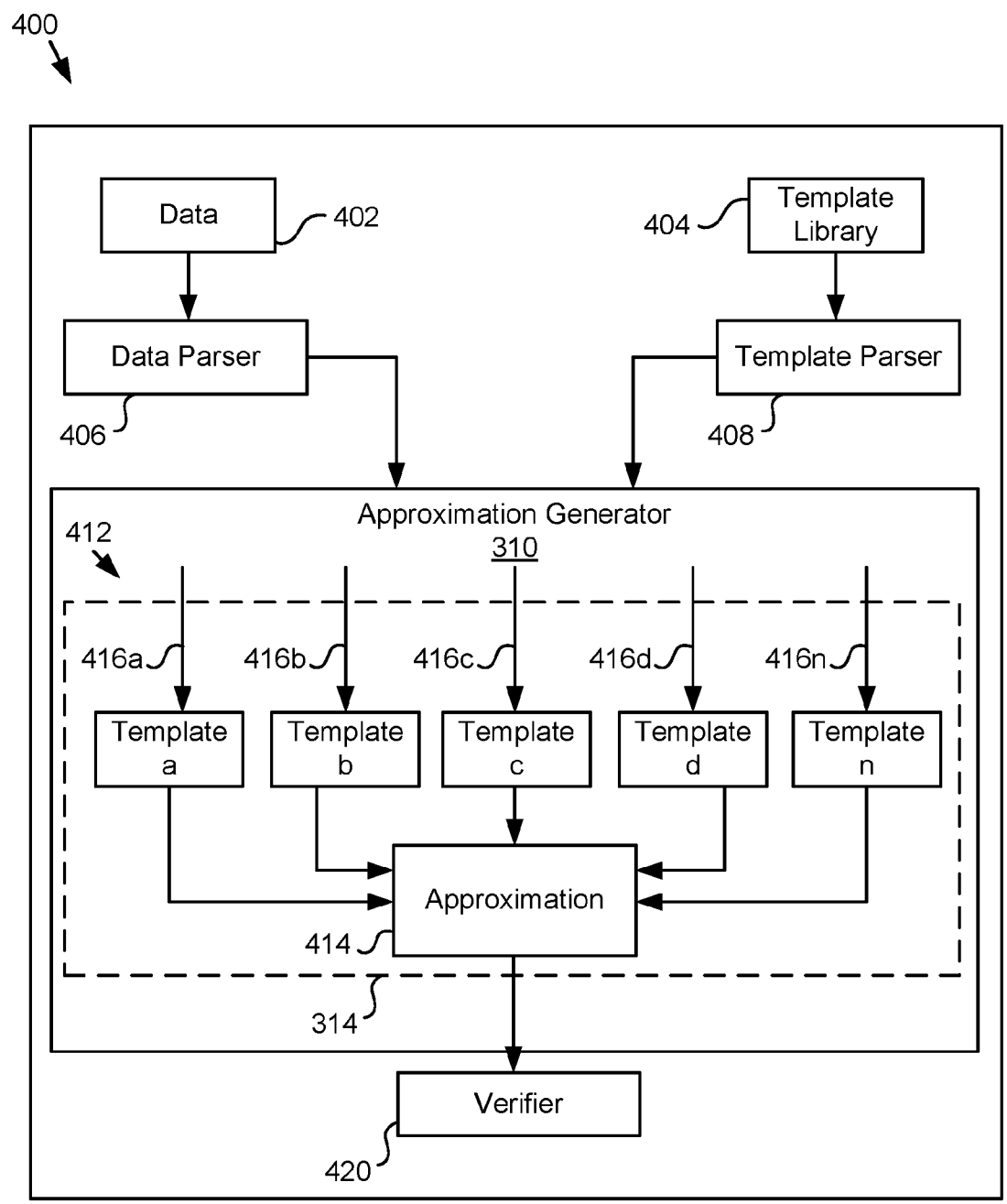
FIG. 4 is a block diagram of an example application and data flow for generating and verifying an approximation.

FIG. 4 is a block diagram of an example application 400 and data flow for generating and verifying an approximation. The application 400 includes data 402 retrieved from the datastore 300, a data parser 406 that parses the data retrieved from the datastore 300 into a format compatible with the approximation generator 310, although in further embodiments the data may be stored in a format compatible with the approximation generator 310, in which case the data parser 406 may retrieve and input data from the datastore 300 into the approximation generator 310. The application 400 further includes a template library 404, a template parser 408, and the approximation generator 310.

The data parser 406, the template parser 408, the approximation generator 310, and the machine learning framework 314, and the verifier 420 may be coupled for communication with one another, the web server 134, the e-commerce application 136, and the user application 538, and/or the datastore(s) 300 and/or data repositories to call functions and/or store, update, and/or retrieve data.

The data parser 406, the template parser 408, the approximation generator 310, the machine learning framework 314, the verifier 420, the user application 538 (see FIG. 5), the web server 554 (see FIG. 5), and/or other components may be computer-executable elements of the system 500. In some cases, these components may be referred to as the actor (in the third person) for convenience and so as not to obscure the acts, operations, and functionalities (also referred to simply as operations) carried out by them. However, it should be understood that these components may comprise software (set(s) of computer instructions, computer programs, etc.) that, when executed by one or more computing devices (e.g., including standard hardware computer processors), program the computing device(s) to perform the specific operations described herein. Further, it should be understood that these components (e.g., set(s) of computer instructions) or portions thereof could additionally and/or alternatively be implemented in hardware circuitry included in the computing device(s), such a field-programmable gate array (FPGA), an application-specific integrated circuit (ASIC), or other suitable circuitry without departing from the scope of this disclosure.

The template library 404 includes various different templates, which include programming logic for processing various functions. Example functions include linear functions, quadratic functions, sin and cosine functions, polynomial functions, etc. Further functions may include equations models of physical systems, such as but not limited to engine control models, etc. The functions include input and parameter variables as described elsewhere herein. For example, a linear function may include $f(x)=a_1x_1+a_2x_2+a_3=0$, where $x_1$ and $x_2$ are inputs and $a_1$, $a_2$, and $a_3$ are parameters whose values are unknown/not yet determined. In another example, a quadratic function may include $f(x)=a_1x_1^2+a_2x_2^2+a_3x_1x_2=0$, where $x_1$ and $x_2$ are inputs and $a_1$, $a_2$, and $a_3$ are parameters whose values are unknown/not yet determined. In some cases, the template library 404 may be extended by a user to adapt the system 500 to determine an approximation for a particular/custom system being modeled by the user.

The template parser 408 parses template(s) retrieved from the template library into parsed template(s) suitable for input and/or processing by the approximation generator 310.

The data 402 includes a set of data entries retrieved from the datastore 300. The approximation generator 310 includes and/or cooperates with the machine learning framework 314, which is programmed to learn the parameters using the data from the datastore 300 and data from the parsed template(s) input into the approximation generator 310.

In some embodiments, the template library may be sorted by one or more criteria, such as by complexity. In some cases, sets of templates may be grouped according to complexity labels (e.g., simple, moderate, complex), or may be ranked accordingly using a scoring value. For instance, an example template having a lowly complex level may include a linear function (e.g., $y=a_1x+x_2$), a moderately complex level template may include a quadratic function (e.g., $y=a_1x_1^2+a_2x_1^2+a_3$) and a piecewise linear function with two cases, a highly complex level template may include cubic functions, piecewise linear functions with three cases, and a piecewise quadratic function with two cases, etc. In some cases, various complexity levels may include sine/cosine functions, standard engine control equations, etc. Other variations are also possible and contemplated as discussed elsewhere herein.

In some embodiments, a user, using an input devices of a computing device (e.g., a pointer device, touchscreen, etc.) inputs one or more indexes for one or more templates in the library. In the case where the user selects a plurality of templates, the approximation generation 310 may invoke a parallel thread 416a-416n for each parsed template a-n. The machine learning framework 314 may process each thread 416a-416n and produce a single approximation 414 or a plurality of approximation(s) 414 based on the parsed templates a-n and corresponding data from the datastore 300. Using a plurality of templates (e.g., iteratively, in parallel in batches accordingly to complexity, etc.), an optimized approximation may efficiently be determined in some cases.

The approximation generator 310 may determine the parameter value(s), and calculate, using the template(s) and the parameter value(s), approximation(s) 414 based on an error value. As a non-limiting example, the approximation generator 310 may, using templates $y=f(a, x)$ at a lowest level of complexity, apply machine learning to find an appropriate value of "a" for each template, and compare the approximation error between the different templates. So, if $y_i$ is the $i^{th}$ output of a datastore (e.g., LUT), and there are m entries in the LUT, the approximation generator 310 may calculate the error (e.g., mean-squared-error using $(1/m)*\mathrm{Sum}((f(a,x)-y_i)^2)$. Then, the verifier 420 may use the approximation to prove that the model for the datastore is correct. If unsuccessful, the approximation generator 310 may iterate a more complex template(s) from the template library to better model the datastore. In further examples, the application 400 may utilize a falsification technique and/or alternate between the iterative approached described above (which attempts to prove correctness) and the falsification technique (which attempts to prove incorrectness) until one of techniques is successful.

As discussed elsewhere herein, an approximation 414 may include the fitted programming logic from the program template(s) to which it corresponds, thus allowing the approximation 414 to fit such as sharp corners and other anomalies in the data of the datastore 300, and thereby accurately reflecting (e.g., tightly fitting) the input/output behavior of the datastore 300. The approximation 414 can be used by the verifier 420 as a proof or portion thereof during verification.

In some embodiments, the approximation 414 having lowest error value or an error value with a predetermined range is selected, as discussed elsewhere herein. In some embodiments, the approximation generator 310 may be configured to determine a vector of parameter value(s) that minimize mean-squared error over the data stored in the datastore 300, and which are used to populate the program template(s) to yield the approximation, as discussed elsewhere herein.

In some embodiments, the approximation generator 310 may determine upper and lower bounds using the approximation 414, which may be used by the verifier 420 to efficiently verify a complex system by determining whether values lie within or outside of the upper and lower bounds.

Figure 5:
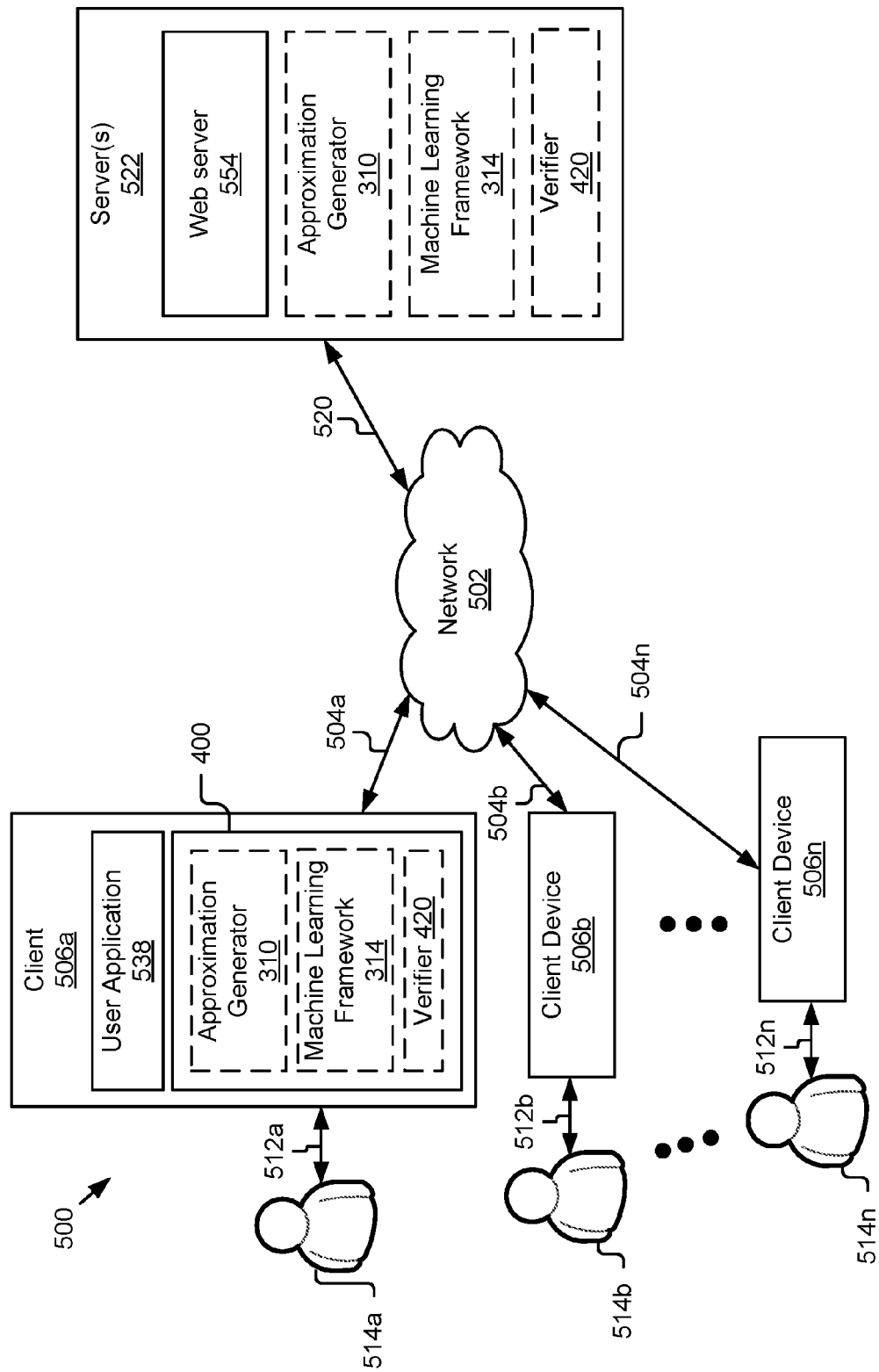
FIG. 5 is a block diagram of an example computing system.

FIG. 5 is a block diagram of an example computing system 500 that may include a client device 506a . . . 506n (also referred to herein individually and/or collectively as 506) and server(s) 522, which are electronically communicatively coupled via a network 502 for interaction with one another, although other system configurations are possible including other devices, systems, and networks. For example, the system 500 could include any number of client devices 506, third-party servers, servers 522, and/or other systems and devices.

The client devices 506a . . . 506n, and their components, may be coupled to the network 502 via signal lines 512a . . . 512n. The server(s) 522 and their components may be coupled to the network 502 via signal line 520. The users 514a . . . 514n may access one or more of the devices of the system 500. For example, as depicted, a user 514a may access and/or interact with the client device 506a as illustrated by line 512a, a user 514b may access and/or interact with the client device 506b as illustrated by line 512b, and a user 514n may access and/or interact with the client device 506n as illustrated by line 512n.

The network 502 may include any number of networks and/or network types. For example, the network 502 may include, but is not limited to, one or more local area networks (LANs), wide area networks (WANs) (e.g., the Internet), virtual private networks (VPNs), wireless wide area network (WWANs), Long Term-Evolution (LTE) networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols.

A client device 506 includes one or more computing devices having data processing and communication capabilities. The client device 506 may couple to and communicate with other client devices 506 and the other entities of the system 500 via the network 502 using a wireless and/or wired connection. Examples of client devices 506 may include, but are not limited to, mobile phones, tablets, laptops, desktops, netbooks, server appliances, servers, virtual machines, TVs, etc. The system 500 may include any number of client devices 506, including client devices of the same or different type.

The client device(s) 506 and/or the server(s) 522 may include instances of the application 400 or component(s) thereof, such as approximation generator 310, machine learning framework 314, and/or verifier 420. In some configurations, the application 400 may be distributed. For instance, the approximation generator 310, the machine learning framework 314, the verifier 420, and/or other components of the application 400 may be distributed over the network 502 on disparate devices in disparate locations or may reside in the same locations.

As a further example, the machine learning framework 314 may be accessed via application programming interfaces exposed by a server hosting the framework 314. For instance, the approximation generator 310 may be executed on first computing device(s) (e.g., a server 522 or a client 506), and may include software methods that instantiate a remote instance the machine learning framework 314 executed on other (second) computing device(s), call methods of the machine learning framework 314 remotely to instruct the machine learning framework 314 to process the data input into the machine learning framework 314 (e.g., parsed template(s), which may include an array of to-be-determined parameters, an array of inputs, and/or an array of corresponding functions, etc.).

In some embodiments, the application 400 may be executed on local computing device(s) 104, and the user may interact and execute functions of the application 400 using the user application 538. The user application 538 may provide interfaces and other aspects that allow the user to utilize the features of the approximation generator 310 and/or the verifier 420. During processing, the approximation generator 310 may pass data to the machine learning framework 314 operating on the same computing device by instantiating local software methods. Numerous other variations are also possible and contemplated.

The client devices 506 may store and/or operate other software such as a user application 538, an operating system, other applications, etc., that may be configured to interact with components of the application 400, other system 500 components via the network 502, etc.

The server(s) 522 have data processing, storing, and communication capabilities, as discussed elsewhere herein. The server(s) 522 may include one or more computing devices, one or more non-transitory memory devices, one or more datastores, one or more input and/or output devices, a communications bus coupling the server components, etc. For example, the server(s) 522 may include one or more hardware servers, server arrays, storage devices and/or systems, etc. In some embodiments, the server(s) 522 may include one or more virtual servers, which operate in a host server environment.

The web server 554 includes computer logic executable one or more computing devices to process content requests. The web server 554 may include an HTTP server, a REST (representational state transfer) service, or other suitable server type. The web server 554 may receive content requests (e.g., HTTP requests, requests using other protocols, etc.) from client devices 506 or other server(s) 522, cooperate with other the components of the application 400 (e.g., 410, 314, and/or 420) to determine the content, retrieve and incorporate data from a data repository (not shown), format the content, and provide the content to the requesting device(s). In some instances, the web server 554 may format the content using a web language and provide the content to a corresponding user application 138 for processing and/or rendering to the user for display. The web server 554 may be coupled to a data repository to store retrieve, and/or manipulate data stored therein and may be coupled to the application 400 and/or components thereof to facilitate operation thereof. For example, the web server 554 may allow a user on a client device 506 to communicate with the machine learning framework 314, approximation generator 310, other components of the application 400, etc.

Figure 6:
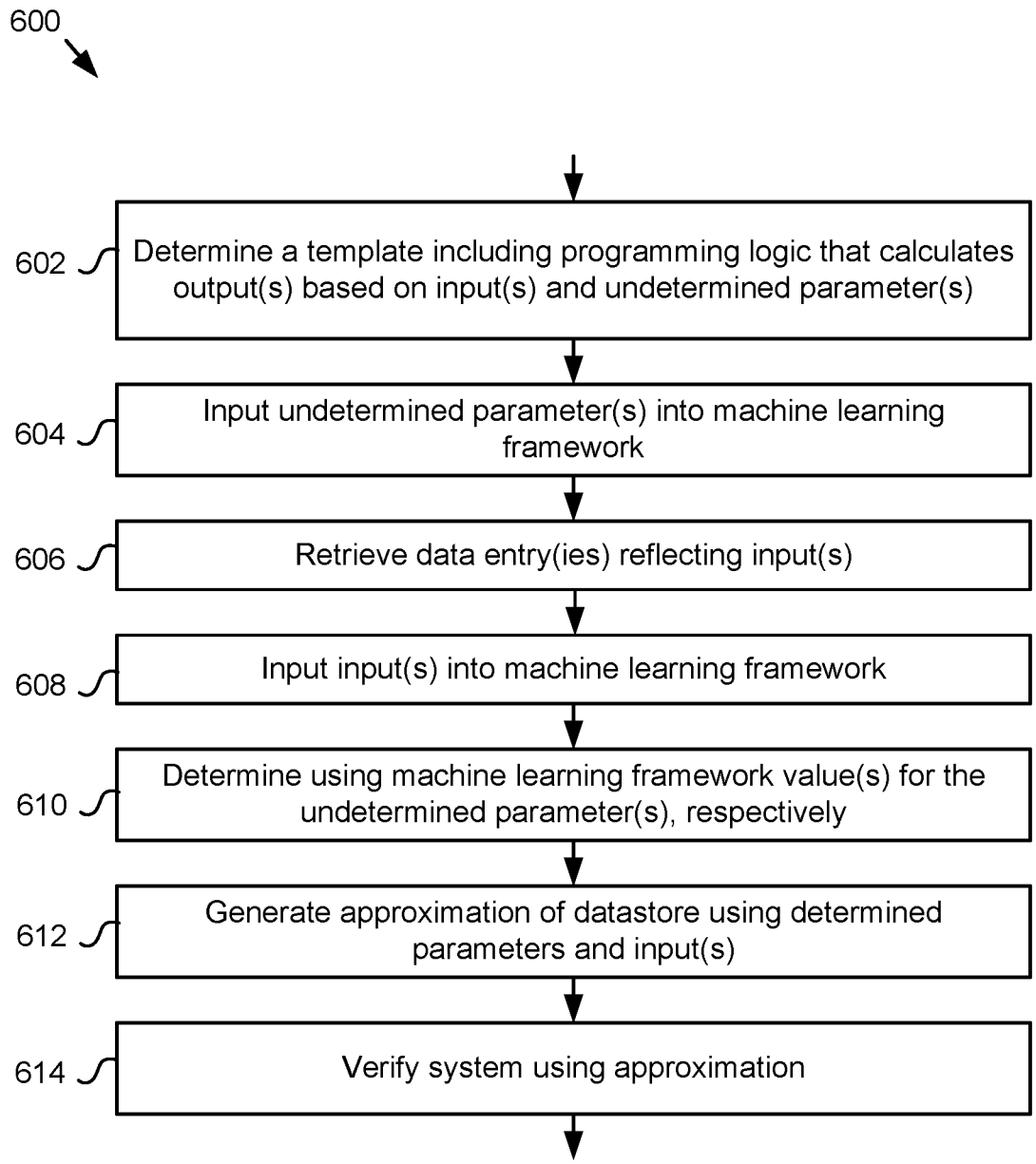
FIG. 6 is a flowchart of an example method for generating an approximation.

FIG. 6 is a flowchart of an example method 600 for generating an approximation 414. In block 602, the template parser 408 determines template(s), each template including programming logic that, when executed, calculates output(s) based on input(s) and parameter(s). The parameter(s) are initially undetermined parameter(s). In block 604, the approximation generator 310 inputs the undetermined parameter(s) into the machine learning framework 314.

In block 606, the data parser 406 retrieves, from the datastore 300 storing a multiplicity of indexed data entries. The data entry(ies) may reflect input(s) for the programming logic. In block 608, the approximation generator 310 inputs the input(s) into the machine learning framework 314.

In block 610, the machine learning framework 314 determines value(s) for the undetermined parameter(s), respectively. The value(s) are value(s) for the undetermined parameter(s), respectively, thus making the undetermined parameter(s) determined parameter(s). In some cases, the undetermined parameter(s) include a plurality of undetermined parameters and the values determined by the machine learning framework 314 are the values of those parameters, which are now determined. The programming logic may include a plurality of conditional statements, each of which may include a corresponding undetermined parameter for which a value has now been learned by the machine learning framework.

In block 612, the approximation generator 310 and/or the machine learning framework 314 generate an approximation of the datastore using the one or more determined parameters, the template(s), and the one or more inputs. In some cases, generating the approximation of the datastore includes determining a smoothed function and corresponding upper and a lower bounds for the multiplicity of indexed data entries.

In some embodiments, a plurality of data entries are retrieved in block 606 reflecting a plurality of cases, and generating the approximation of the datastore in block 612 includes summing the cases. In some instances, the plurality of cases may be mutually exclusive and the summing the cases includes calculating a sum of sigmoids. In some further instances, the plurality of cases may be concordant and approximating the program includes adding an additional product to disable to disable previous cases.

In block 614, the verifier 420 verifies a system, such as but not limited to control software that includes or relies upon the datastore 300, using the approximation.

FIGS. 7A and 7B are diagrams showing example approximations. As shown, the template programming logic includes an if-statement 700 including a piecewise function g(a,x), which is disjointed (e.g., not smooth) and/or concave (e.g., not convex).

Figure 8A:
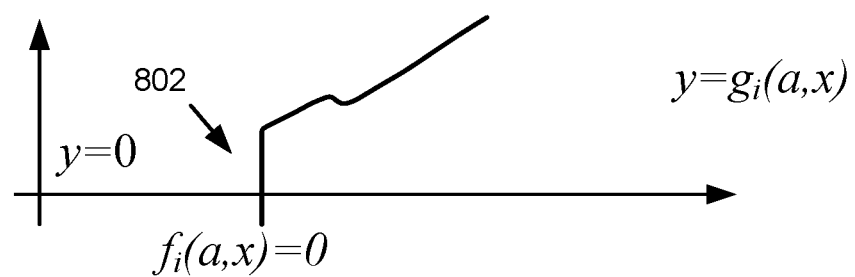
FIG. 8A is a disjointed graph reflecting a shifted step function from an if-statement.
Figure 8B:
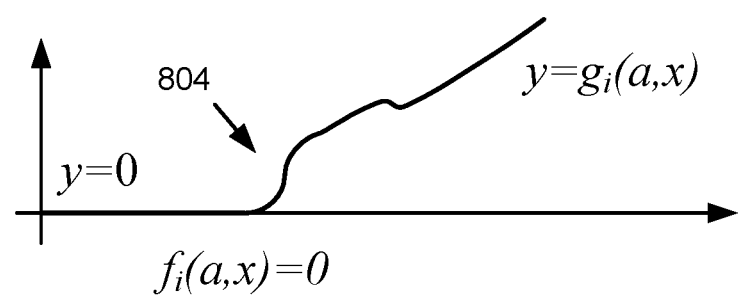
FIG. 8B is a smoothed graph reflecting an approximation of a step function from an if-statement.

The approximation generator 310 may represent the function of the if-statement 700 as a sum of sigmoids, which advantageously smooths out the disjoined nature of the function to provide smooth switching. For example, FIG. 8A is a disjointed graph 802 reflecting shifted step function from the if-statement 700, and FIG. 8B is a smoothed graph 804 reflecting an approximation of the step function from the if-statement 700 (e.g., using the sum of sigmoids).

In some embodiments in which cases are mutually exclusive, the overall conditional statement may be represented as a sum of sigmoids 702. This approach differs from the processing performed by a conventional neural network layer because functions from the programming logic are multiplied by the sigmoids as shown. In some embodiments in which cases are concordant, the overall conditional statement may be represented as a sum of sigmoids with prior cases disabled 706.

The approximations described herein can advantageously be optimized to be smooth and convex, which the approaches in the Background are either unable to provide or unable to provide without significant manual intervention and computationally expensive and/or unachievable data processing (under real world conditions).

By way of further example, the approximation generator 310 may abstract/approximate a datastore(s) 300 by functional intervals. A functional interval may be a function that for each argument $x \in \mathbb{R}^n$ returns a (closed) interval over R, $A(x)=[a(x),b(x)]$. The functional interval $A(x)$ may approximate a lookup table $L(x)$ over a set $S \subseteq \mathbb{R}^n$ if for every $x \in S$, $L(x) \in A(x)$. The approximation generator 310 may use a learning-based procedure to automatically compute a functional interval for each datastore 300 in the model by: fixing a parametric template for a function that approximates the datastore 300, learning parameter values that allow the function to approximate the lookup table data, and using bisection search to search for the smallest offset that can be added and subtracted from the approximation to yield upper and lower bounds for the lookup table function.

More particularly, the approximation generator 310 may learn an approximation of the lookup table data by letting $f(a, x)$ be a function parametrized by $a \in \mathbb{R}^p$, with the same domain and range as the lookup table function L, and solving a regression problem to find the value of the parameter vector a that minimizes the mean-squared error over the breakpoints of the lookup table as follows:

$$\underset{a}{\text{minimize}} \sum_{i=1}^{k} (y^{(k)} - f(a, x^{(k)}))^2$$

Next, the approximation generator 310 may the approximation $f$ to learn a functional interval by setting the offset to some initial value, e.g., $\epsilon=1$. The approximation generator 310 and/or verifier 420 may then use an SMT solver to check whether the lower and upper offset functions $f(x)-\epsilon$ and $f(x)+\epsilon$ are lower and upper bounds and for the lookup table function over all values in the range of interest $S \subseteq \mathbb{R}^n$.

If the validity check fails (e.g., the 310 and/or 420 is able to find an $X \in S$ such that the datastore 300 produces a value outside of the upper and lower bounds), the approximation generator 310 and/or verifier 420 may try again with a larger value of $\epsilon$. If it succeeds, with this value as the upper cap (valid $\epsilon$) and 0 (invalid $\epsilon$) as the lower cap, the approximation generator 310 may do a bisection search to find the smallest value of $\epsilon$ (within some tolerance) such that the offset functions abstract the lookup table. This may yield a functional interval, $$A(x)=[f(x)-\epsilon, f(x)+\epsilon],$$

such that for all $x \in S$, $L(x) \in A(x)$. A bisection search may be used to determine the optimal $\epsilon$ approximately. FIG. 9 depicts an example datastore 300, which is linearly interpolated with n inputs and m breakpoints. In some embodiments, using the datastore 300, the application 400 may compute two functions $\overline{y}(x)$ and $\underline{y}(x)$ such that:
1. for each $x^{(j)}=(x_1^{(j)}, \ldots, x_n^{(j)})$, $\overline{y}(x^{(j)}) \geq y^{(j)}$ and the upper bound error $\overline{e}=\overline{y}(x^{(j)})-y^{(j)}$,
2. for each $x^j=(x_1^{(j)}, \ldots, x_n^{(j)})$, $\underline{y}(x^{(j)}) \leq y^{(j)}$ and the lower bound error $\underline{e}=\underline{y}(x^{(j)})-y^{(j)}$ is small, and
3. $\overline{y}(x)$ and $\underline{y}(x)$ have a simple arithmetic structure, e.g. low-order polynomials or rational functions, or contain few transcendental terms.

As discussed in the Background, the above requirements may conflict using existing approaches. $\bar{y}(x)$ and $\underline{y}(x)$ can be computed such that the bound errors $\bar{e}$ and $\underline{e}$ are within an acceptable range, for example, by using a regression technique on a function template. Attaining low bound errors, however, would require high-order polynomials or other complex nonlinear functions, which bear the significant disadvantages discussed in the Background. On the other hand, overly simple bounding functions may have a large bounding error.

The application 400 can optimize for these requirements by defining a database approximation structure $A(x)$ as the interval between the two functions, $A(x)=[\underline{y}(x), \bar{y}(x)]$. These definitions indicate that for every $x_i^{(j)}$, $y^{(j)} \in A(x_i^{(j)})$.

The program template may include the below programming logic having the following function templates $f_i(x, a)$ and $g_i(x, a)$, in which the objective is to instantiate values for the parameter vector a. An example program template may include the following programming logic:

if($g_1(x,a)$>0)

$y=f_1(x,a)$;

elseif($g_2(x,a)$>0)

$y=f_2(x,a)$;

elseif($g_k(x,a)$>0)

$y=f_k(x,a)$

In some embodiments, program templates are optimized to have a structural parameter with a range of values are used, such as $k \in \{k_1, k_2, \ldots\} \subset \mathbb{N}$. In some cases, when a datastore 300 (e.g., LUT) can be approximated by a single smooth function, k=1.

For each value of k, the approximation generator 310 approximates the programming logic using the following smooth function with sigmoids:

$$\tilde{y}(x, a) = \sum_{i=1}^{k} f_i(x, a) \left( \prod_{k=1}^{i-1} \text{sigmoid}(-g_k(x, a)) \right) \text{sigmoid}(g_i(x, a)).$$

Further, the approximation generator 310 uses machine learning provided by the machine learning framework 314 to instantiate values for a parameter vector a, a. The machine learning framework 314 may be tuned to minimize the error when determining the values for the parameter vector. For instance, the machine learning framework 314 may determine a value of a that minimizes a loss function $\mathcal{L}: y \times y \rightarrow \mathbb{R}$ over the datastore entries as indicated in the following equation:

$$\min_{a \in \mathbb{R}^Z} \sum_{j=1}^{m} \mathcal{L}(y(x^{(j)}), y^{(j)}).$$

Once the parameter vector is determined, the approximation generator 310 replaces a=â in the original program template, yielding an approximation of the datastore 300.

During verification, the verifier 420 may select, from among the values of k of populated program templates, a program template whose corresponding programming logic has a particular error value or range (e.g., smallest) over the linear interpolation of the data in the datastore.

In some cases, the n-dimensional LUT 900 with m-breakpoints may reflect a function $\lambda: \mathbb{R}^n \rightarrow \mathbb{R}$, such that for each breakpoint $(x^{(k)}, y^k)$, ($k \in \{1, \ldots, m\}$) that appears in the table, $\lambda(x^k)=y^k$, and for every point $x \in \mathbb{R}^n$ that does not appear in the table, if each component $x_i$ may be contained in the range of the LUT, e.g., $\min_k(x_i^k) \leq x_i \leq \max_i(x_i^k)$ for each $i \in \{1, \ldots, n\}$, then $\lambda(x)$ is given by some interpolation function (e.g., interp).

Otherwise, $\lambda(x)$ may be given by some extrapolation scheme (e.g., extrap).

For n dimensions, the following notation may be used notation multiLinInterp$_n$ (($x^{(1)}, y^{(1)}$), ($x^{(2)}, y^{(2)}$), x)

to mean the n-dimensional interpolation function between points ($x^{(1)}, y^{(1)}$) and ($x^{(2)}, y^{(2)}$) are evaluated at x. The range of interest may be extrapolated or limited to the range of the LUT.

Some embodiments may encode a system and its specification into first-order logic. An n-dimensional, m-breakpoint LUT may be encoded as a first-order logical formula. For example, for a two-dimensional lookup table with m breakpoints, the k-th breakpoint can be encoded by the following logical formula when k=1, . . . ,m−1:

$$b_k \equiv x_1^{(k)} \leq x_1 \leq x_1^{(k+1)} \wedge x_2^{(k)} \leq x_2 \leq x_2^{(k+1)} \rightarrow$$

$$y = \text{multiLinInterp}_2((x^{(k)}, y^{(k)}, (x^{(k+1)}, y^{(k+1)}), x).$$

The vector x is the input of the lookup table, and $x_1$ and $x_2$ are its components. The function multiLinInterp$_2$ is a bilinear interpolation.

The overall lookup table can be expressed by the conjunction of the logical formulas for the breakpoints as follows:

$$L \equiv \bigwedge_{k=1}^{m} b_k$$

Figure 10:
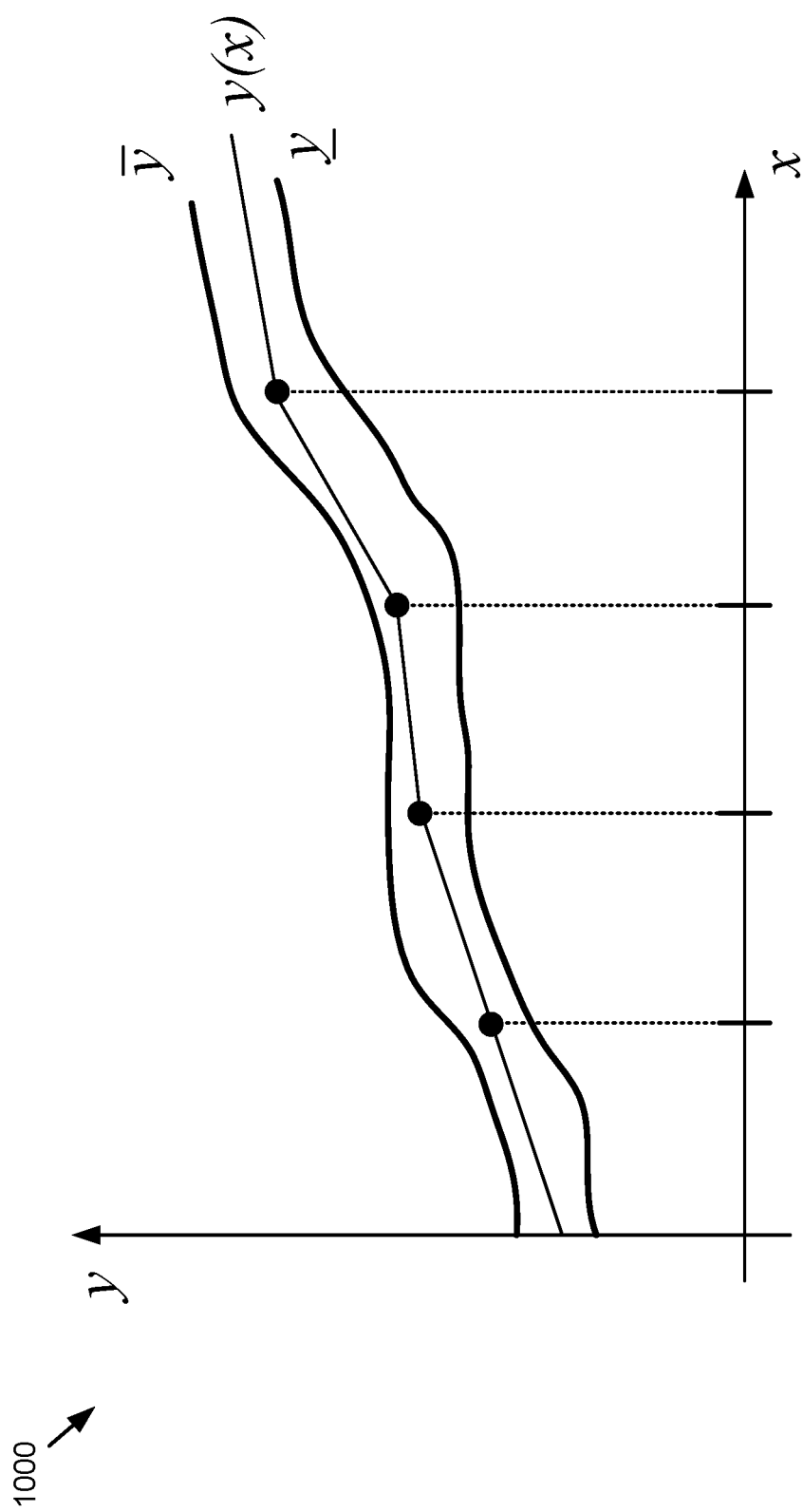
FIG. 10 is a graph showing an example approximation.

FIG. 10 is a graph representing an example approximation 1000 having upper and lower bounds, and following the following assumptions: $\forall x$, assume (x) $\Rightarrow \underline{y}(x) \leq y(x) \leq \bar{y}(x)$. The approximation 1000 can advantageously fit sharp corners while providing the advantage of not having to process every case in the datastore during verification.

As a further practical, non-limiting example, the system being modeled may include an adaptive cruise controller along with an online monitor. When enabled, adaptive cruise control regulates the speed of the car so that a target speed is maintained, unless another car is detected at some distance in front, in which case the system tries to maintain a safe distance from the lead car. The controller takes as input the current speed of the car, the distance to the lead car, and the relative speed between the two cars.

The system model may include a cascade of three lookup tables. The inputs to the controller may include s, the speed of the controlled car, $\Delta_x$, the distance to the leading car, and $\Delta_v$, the relative speed of the two cars. The first lookup table may use the current velocity s of the controlled car to determine a target set distance ($\Delta_x^{(target)}$) from the leading car. If the controlled car is moving fast, its braking distance will be larger, which requires that the controller choose a longer following distance. $\Delta_x^{(error)}$ is the difference between the target following distance and the chosen following distance, and the second lookup table uses $\Delta_x^{(target)}$ together with the relative velocity $\Delta_v^{(target)}$ to choose an acceleration.

The third lookup table behaves as an online monitor, which, in practice, may be populated by recording observations of a physical component (e.g., populated with the computed the future distance between the two cars after 0.1 seconds, given the current distance, relative velocity, and chosen acceleration). In this example, the monitor assumes that the lead car will not change its velocity within the next 0.1 seconds. In this example, the first lookup table contains 21 breakpoints, the second contains 1155 breakpoints, and the third, monitor lookup table contains 385 of breakpoints. In total, the cascaded lookup tables produce 9,338,175 proof cases.

The model is translated to first order logic as follows in part:

$$0 \le \Delta_x \le 180$$

$$-50 \le \Delta_v \le 50$$

$$0 \le s \le 180$$

$$\Delta_x^{(target)} = LUT_1(s)$$

$$\Delta_x^{(error)} = \Delta_x - \Delta_x^{(target)}$$

$$a = LUT_2(\Delta_x^{(error)}, \Delta_v)$$

$$\Delta_x^{(next)} = LUT_3(\Delta_x, \Delta_v, \Delta v^{(next)})$$

The constraints on $\Delta_x$, $\Delta_v$, and s are assumptions on the bounds of these inputs (e.g., commercial adaptive cruise control systems typically cannot be used if the speed of the controlled car is too slow). The abstraction computed for the $LUT_1$ comprises a linear function, shifted above and below the lookup table data:

$$A_1 = [1.27s + 0.43 + 29.69, 1.27s + 0.43 - 29.69]$$

The abstraction computed for $LUT_2$ is a piecewise linear function, and has the form $$A_2 = [f_2(x) + \epsilon_2, f_2(x) - \epsilon_2]$$

where $$f_2 = \begin{cases} 0.024\Delta_x^{(error)} + 0.093\Delta_v - 0.508 & \text{if } g_2(x) \ge 0 \\ 0.020\Delta_x^{(error)} + 0.093\Delta_v - 0508 & \text{otherwise} \end{cases}$$

and $$g_2(x) = 0.321\Delta_x^{(error)} - 1.232\Delta_v - 1.$$

The abstraction computed for $LUT_3$ is also a piecewise linear function, $$A_3 = [f_3(x) + \epsilon_3, f_3(x) - \epsilon_3]$$

where $$f_3 = \begin{cases} f_3^{(1)} & \text{if } g_3(x) \ge 0. \\ f_3^{(2)} & \text{otherwise} \end{cases}$$

and $$f_3^{(1)} = 0.997\Delta_x + 0.006\Delta_v - 0.003\Delta_x^{(next)} + 0.409$$

$$f_3^{(2)} = 1.593\Delta_x - 0.006\Delta_v - 0.059\Delta_x^{(next)} + 1.143$$

$$g_3(x) = 0.795\Delta_x - 0.222\Delta_v - 0.476\Delta_x^{(next)} + 0.503.$$

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

It should be understood that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the described system(s) may be integrated into to a single computing device or system or additional computing devices or systems, etc. In addition, while the system 500 depicted in FIG. 5 provides an example of an applicable computing architecture, it should be understood that any suitable computing architecture, whether local, distributed, or both, may be utilized in the system 500.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated otherwise as apparent from the following discussion, it is appreciated that throughout this disclosure, discussions utilizing terms including "processing," "computing," "calculating," "determining," "displaying," "inputting," "identifying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to a computing device and/or other apparatus for performing the operations herein. This computing device may be specially constructed for the required purposes, or it may comprise a general-purpose computer selectively activated or reconfigured by a computer program stored in the computer. Such a computer program may be stored in a non-transitory memory device(s) such as a computer readable storage medium, including, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with nonvolatile memory or any type of media suitable for storing electronic instructions, each coupled to a computer system bus.

The technology described herein can take the form of a hardware implementation, a software implementation, or implementations containing both hardware and software elements. For instance, the technology may be implemented in executable software, which includes but is not limited to an application, firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A computing device suitable for data processing, storing, and/or executing program code may include at least one processor coupled directly or indirectly to memory elements through a system bus. The non-transitory memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Communication unit(s) (e.g., network interfaces, etc.) may also be coupled to the system to enable the data processing system to become coupled to other data processing systems, storage devices, remote printers, etc., through intervening private and/or public networks, such as the network 502.

Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Various general-purpose systems may be adapted with programs in accordance with the teachings herein, or it may prove convenient to construct more specialized apparatus to perform the required method blocks. The required structure for a variety of these systems will appear from the description above. Any suitable programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

The components, frameworks, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method for abstracting a dataset storing a multiplicity of data, comprising:
    determining, using one or more computer processors, a template including programming logic that, when executed, calculates one or more outputs based on one or more template inputs and one or more parameters, the one or more parameters being initially one or more undetermined parameters;
    inputting, using the one or more computer processors, the one or more undetermined parameters into a machine learning framework;
    retrieving, from a datastore storing a multiplicity of indexed data entries, a plurality of data entries reflecting a plurality of cases;
    inputting, using the one or more computer processors, a plurality of inputs into the machine learning framework, the plurality of inputs including the plurality of cases;
    determining, using the one or more computer processors and the machine learning framework, one or more values for the one or more undetermined parameters, respectively, the one or more values being values for the one or more undetermined parameters, respectively, and making the one or more undetermined parameters, one or more determined parameters;
    calculating, using the one or more computer processors, a sum of the plurality of cases; and
    generating, using the one or more computer processors, an approximation of the datastore using the one or more determined parameters and the sum of the plurality of cases.

2. The computer-implemented method of claim 1, wherein the datastore includes one or more lookup tables associated with a complex system.

3. The computer-implemented method of claim 2, wherein the complex system is an automotive system.

4. The computer-implemented method of claim 1, wherein generating the approximation of the datastore includes determining an upper bound and a lower bound for the multiplicity of indexed data entries.

5. The computer-implemented method of claim 1, wherein the one or more undetermined parameters include a plurality of undetermined parameters, the programming logic includes a plurality of conditional statements, each of the conditional statements includes a corresponding undetermined parameter from the plurality of undetermined parameters, the one or more values determined using the machine learning framework include a plurality of values for the undetermined parameters, respectively, and making the plurality of undetermined parameters a plurality of determined parameters.

6. The computer-implemented method of claim 5, wherein the one or more template inputs includes a plurality of template inputs, the programming logic includes a piecewise function, each of the conditional statements includes a different sub-function of the piecewise function, each different sub-function including the corresponding undetermined parameter and a corresponding input from the plurality of template inputs.

7. The computer-implemented method of claim 1, wherein the plurality of cases are mutually exclusive and calculating the sum of the plurality of cases includes calculating a sum of sigmoids.

8. The computer-implemented method of claim 1, wherein the plurality of cases are concordant and generating the approximation includes adding an additional product to disable to disable previous cases.

9. The computer-implemented method of claim 1, wherein the multiplicity of indexed data entries includes $10^{10}$ or more entries.

10. A computer system, comprising:
one or more computer processors;
one or more computer memories storing instructions that, when executed by the one or more computer processors, perform operations comprising:
determining a template including programming logic that, when executed, calculates one or more outputs based on one or more template inputs and one or more parameters, the one or more parameters being initially one or more undetermined parameters;
inputting the one or more undetermined parameters into a machine learning framework;
retrieving from a datastore storing a multiplicity of indexed data entries, a plurality of data entries reflecting a plurality of cases;
inputting a plurality of inputs into the machine learning framework, the plurality of inputs including the plurality of cases;
determining, using the machine learning framework, one or more values for the one or more undetermined parameters, respectively, the one or more values being values for the one or more undetermined parameters, respectively, and making the one or more undetermined parameters, one or more determined parameters;
calculating a sum of the plurality of cases; and
generating an approximation of the datastore using the one or more determined parameters and the sum of the plurality of cases.

11. The computer system of claim 10, wherein the datastore includes one or more lookup tables associated with a complex system.

12. The computer system of claim 11, wherein the complex system is an automotive system.

13. The computer system of claim 10, wherein generating the approximation of the datastore includes determining an upper bound and a lower bound for the multiplicity of indexed data entries.

14. The computer system of claim 10, wherein the one or more undetermined parameters include a plurality of undetermined parameters, the programming logic includes a plurality of conditional statements, each of the conditional statements includes a corresponding undetermined parameter from the plurality of undetermined parameters, the one or more values determined using the machine learning framework include a plurality of values for the undetermined parameters, respectively, and making the plurality of undetermined parameters a plurality of determined parameters.

15. The computer system of claim 14, wherein the one or more template inputs includes a plurality of template inputs, the programming logic includes a piecewise function, each of the conditional statements includes a different sub-function of the piecewise function, each different sub-function including the corresponding undetermined parameter and a corresponding input from the plurality of template inputs.

16. The computer system of claim 10, wherein the plurality of cases are mutually exclusive and calculating the sum of the plurality of cases includes calculating a sum of sigmoids.

17. The computer system of claim 10, wherein the plurality of cases are concordant and generating the approximation includes adding an additional product to disable to disable previous cases.

18. The computer system of claim 10, wherein the multiplicity of indexed data entries includes $10^{10}$ or more entries.

19. A computer-implemented method for abstracting a dataset storing a multiplicity of data, comprising:
determining, using one or more computer processors, a template including programming logic that, when executed, calculates one or more outputs based on one or more template inputs and a plurality of parameters, the plurality of parameters being initially a plurality of undetermined parameters, the programming logic including a plurality of conditional statements, each of the conditional statements including a corresponding undetermined parameter from the plurality of undetermined parameters;
inputting, using the one or more computer processors, the plurality of undetermined parameters into a machine learning framework;
retrieving, from a datastore storing a multiplicity of indexed data entries, one or more data entries reflecting one or more inputs;
inputting, using the one or more computer processors, the one or more inputs into the machine learning framework;
determining, using the one or more computer processors and the machine learning framework, a plurality of values for the plurality of undetermined parameters, respectively, the plurality of values being values for the plurality of undetermined parameters, respectively, and making the plurality of undetermined parameters, a plurality of determined parameters; and
generating, using the one or more computer processors, an approximation of the datastore using the plurality of determined parameters and the one or more inputs.

* * * * *